(12) United States Patent
Wang

(10) Patent No.: US 11,824,978 B2
(45) Date of Patent: Nov. 21, 2023

(54) CRYPTOGRAPHIC KEY GENERATION SYSTEM AND METHOD

(71) Applicant: Visa International Service Association, San Francisco, CA (US)

(72) Inventor: Quan Wang, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/752,767

(22) Filed: May 24, 2022

(65) Prior Publication Data
US 2022/0286279 A1    Sep. 8, 2022

Related U.S. Application Data

(63) Continuation of application No. 16/756,095, filed as application No. PCT/US2017/059371 on Oct. 31, 2017, now Pat. No. 11,387,994.

(51) Int. Cl.
*H04L 9/08*       (2006.01)
*H04L 9/40*       (2022.01)
(Continued)

(52) U.S. Cl.
CPC .......... *H04L 9/0866* (2013.01); *H04L 9/0869* (2013.01); *H04L 9/0872* (2013.01);
(Continued)

(58) Field of Classification Search
CPC ... H04L 9/0866; H04L 9/0869; H04L 9/0872; H04L 63/0435; H04L 9/3239; H04L 9/3247; H04L 9/50; H04L 2209/805
See application file for complete search history.

(56) References Cited

U.S. PATENT DOCUMENTS 9,078,127 B2 *  7/2015  Kritt ...................... H04L 9/3215
11,032,078 B2 *  6/2021  Sharma ................ H04L 9/3247
(Continued)

FOREIGN PATENT DOCUMENTS

EP    2348447    *  7/2011  .......... H04L 9/3073
EP    2363977        9/2011
(Continued)

OTHER PUBLICATIONS

U.S. Appl. No. 16/756,095, First Action Interview Office Action Summary, dated Nov. 8, 2021, 4 pages.
U.S. Appl. No. 16/756,095, First Action Interview Pilot Program Pre-Interview Communication, dated Sep. 10, 2021, 4 pages.
U.S. Appl. No. 16/756,095, Non-Final Office Action, dated Dec. 2, 2021, 22 pages.
(Continued)

*Primary Examiner* — Jeffrey C Pwu
*Assistant Examiner* — Mayasa A. Shaawat
(74) *Attorney, Agent, or Firm* — Kilpatrick Townsend & Stockton LLP

(57) ABSTRACT

A computing device may be configured to receive a set of inputs from other computing devices. The set of inputs may include inputs derived by the computing devices utilizing cryptographic keys of the computing devices. The set of inputs may be stored in a blockchain such that the inputs are tamper resistant. A symmetric key may be generated (periodically, upon expiration of a timer, according to a protocol set, upon request, etc.) from two or more of the set of inputs. The generated symmetric key may be distributed to the computing devices. The symmetric key may be utilized to encrypt and decrypt communications between two computing devices.

20 Claims, 6 Drawing Sheets

(51) Int. Cl.
  *H04L 9/32* (2006.01)
  *H04L 9/00* (2022.01)

(52) U.S. Cl.
  CPC ........ H04L 63/0435 (2013.01); *H04L 9/3239* (2013.01); *H04L 9/3247* (2013.01); *H04L 9/50* (2022.05); *H04L 2209/805* (2013.01)

(56) References Cited

U.S. PATENT DOCUMENTS

| | | | |
|---|---|---|---|
| 2009/0147958 A1* | 6/2009 | Calcaterra | H04L 9/0833 380/260 |
| 2009/0239500 A1* | 9/2009 | Aripirala | H04W 12/50 455/410 |
| 2009/0327731 A1* | 12/2009 | Appenzeller | H04L 9/3247 726/19 |
| 2010/0017640 A1* | 1/2010 | Gallant | G06F 1/14 713/502 |
| 2012/0008783 A1 | 1/2012 | Montenegro | |
| 2016/0156626 A1* | 6/2016 | Roth | H04L 9/0861 713/169 |
| 2017/0220815 A1 | 8/2017 | Ansari et al. | |
| 2017/0257358 A1 | 9/2017 | Ebrahimi et al. | |

FOREIGN PATENT DOCUMENTS

| | | |
|---|---|---|
| WO | 2011033259 | 3/2011 |
| WO | 2017112019 | 6/2017 |

OTHER PUBLICATIONS

U.S. Appl. No. 16/756,095, Notice of Allowance, dated Feb. 25, 2022, 9 pages.
Application No. EP17930228.6, Extended European Search Report, dated Oct. 8, 2020, 7 pages.
Mayhofer, "The Candidate Key Protocol for Generating Secret Shared Keys from Similar Sensor Data Streams", ESAS '07 Proceedings of the 4th European conference on Security and privacy in ad-hoc and sensor networks. Lecture Notes in Computer Science, ISBN: 978-3-540-73274-7, Jul. 3, 2007, pp. 1-15.
Application No. PCT/US/2017/059371, International Search Report and Written Opinion Received, dated Jul. 12, 2018, 12 pages.
Application No. PCT/US2017/059371, International Preliminary Report on Patentability, dated May 14, 2020, 9 pages.
Application No. PCT/US2017/059371, International Search Report and Written Opinion, dated Jul. 13, 2018, 12 pages.
Application No. EP22187037.1, Extended European Search Report, dated Oct. 14, 2022, 6 pages.

* cited by examiner

CRYPTOGRAPHIC KEY GENERATION SYSTEM AND METHOD

CROSS REFERENCE TO RELATED APPLICATIONS

This application is a Continuation of U.S. application Ser. No. 16/756,095 filed Apr. 14, 2020, which is a U.S. national stage application of PCT/US2017/059371, filed Oct. 31, 2017, the disclosures of which are incorporated herein by reference in their entirety.

BACKGROUND

Households typically include a number of computing devices such as smartphones, computers, printers, network routers, and the like. As technology has evolved, many more devices are becoming network capable. For example, refrigerators, security systems, door locks, gas meters, electric meters, water meters, garage doors, lights, televisions, and other various devices may now be equipped with the ability to transfer data over a network. Thus, it is possible now for a user to turn on a lamp with his phone. A garage door may be opened when the user approaches the door with his phone or turns on his vehicle, for example. Similarly, an entryway door may be unlocked based on proximity of another device (e.g., the user's smartphone), a manual input by the user from his phone, or the like.

Each time these computing devices interact (usually over a wireless area network) there is a chance that details of the data exchange and/or sensitive information associated with the computing device may be intercepted. By way of example, a key code entered by a user via his phone to unlock his door may be intercepted and the security of the user's home may be compromised. Given the proliferation of network enabled computing devices, it is difficult to provide data security to each and every interaction between each and every computing device within a system. Although in some cases, such devices may utilize encryption keys to maintain data security, a device's encryption key may be compromised.

Embodiments of the invention address these and other problems, individually and collectively.

BRIEF SUMMARY

Embodiments of the invention can be applied to the "Internet of things" where computing devices can interact with other computing devices with or without human intervention. In particular, embodiments of the invention are directed to a platform for a network device (e.g., a router, one of the computing devices of a network, a processing server, etc.) configured to store and manage various inputs from the computing devices of a network. Two or more of the set of inputs may be utilized by the network device to generate a symmetric cryptographic key. The computing devices may utilize the symmetric cryptographic key to secure any suitable communications between them.

One embodiment of the invention is directed to a method comprising receiving, by a network device, a set of inputs derived using cryptographic keys associated with a plurality of computing devices in a set of computing devices. The method may further comprise generating, by the network device, a symmetric cryptographic key using at least two of the set of inputs. In at least some embodiments, the generated symmetric cryptographic key may thereafter be used to encrypt communications between at least two computing devices of the set of computing devices.

Another embodiment of the invention is directed to a network device comprising a processor, and a memory including instructions that, when executed with the processor, causes the network device to, receive a set of inputs derived using cryptographic keys associated with a plurality of computing devices in a set of computing devices. Executing the instructions with the processor may further cause the network device to generate a symmetric cryptographic key using at least two of the set of inputs. In at least some embodiments, the generated symmetric cryptographic key may thereafter be used to encrypt communications between at least two computing devices of the set of computing devices.

These and other embodiments of the invention are described in further detail below.

DETAILED DESCRIPTION

Figure 1:
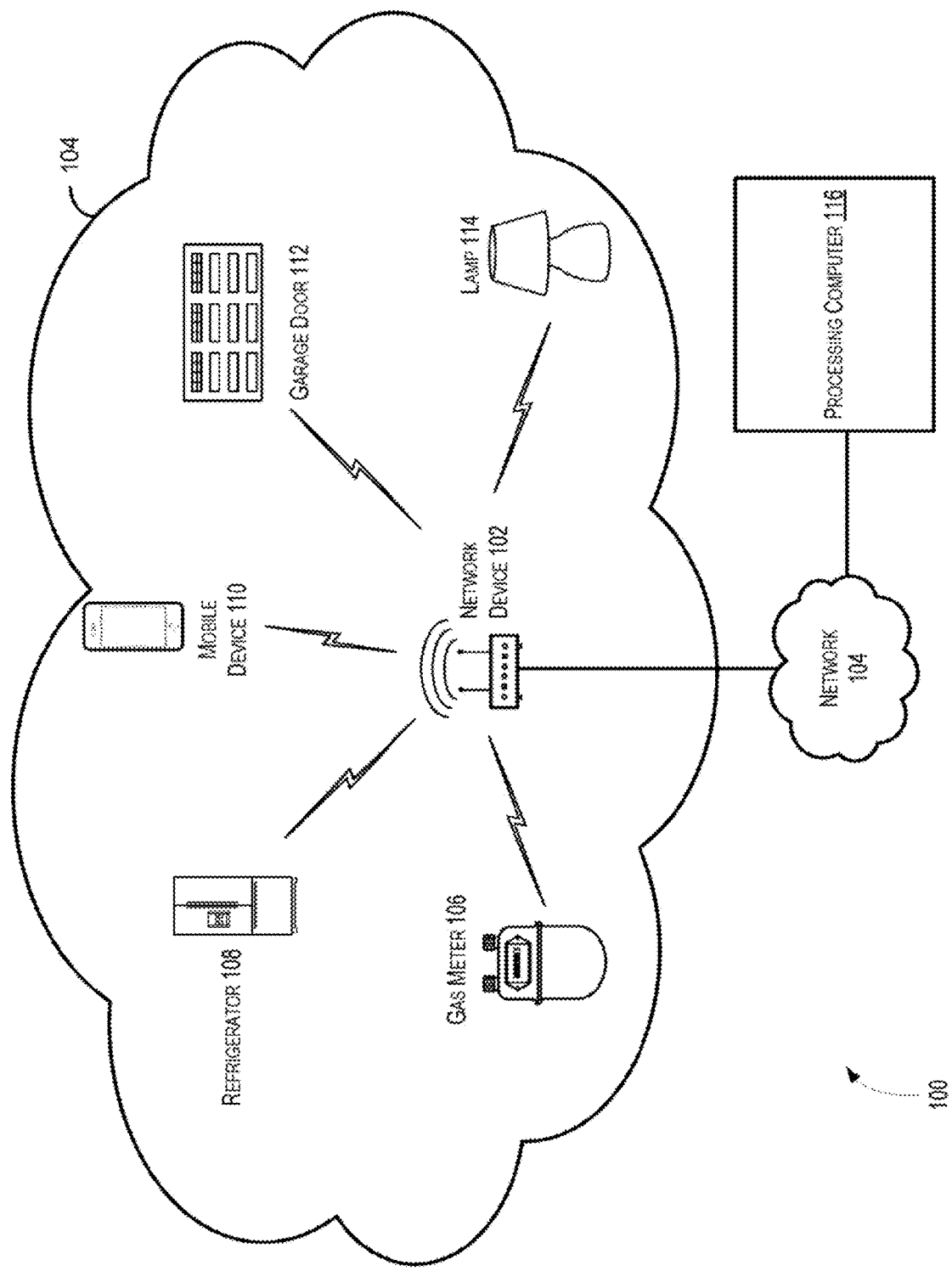
FIG. 1 depicts an example system architecture capable of implementing at least some embodiments of the current disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

An "electronic device," may be any device that accomplishes its purpose electronically. An electronic device may have multiple functions. For example an electronic device may have a primary function and one or more secondary functions. A primary function may be the function that most closely aligns with the electronic device's purpose. An example of an electronic device may be a computing device.

A "user device" may be a device that is operated by a user. Examples of user devices may include a mobile phone, a smart phone, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "network device" may have a primary function that is related to providing network-related functionality. For example, a network router, a modem, a gateway, or the like are examples of network devices. Such devices may provide network-related functionality such as enabling Wi-Fi communications between computing devices of a network, providing Internet access to the computing devices, and the like.

A "computing device" may be any suitable electronic device capable of communicating with, and/or interacting with other devices. A computing device may be a network device, a user device, a processing computer, or any suitable electronic device. A computing device may have a primary function that is unrelated to communicating with other electronic devices. For example, a computing device may be a refrigerator that, in addition to preserving food, is capable of interacting with one or more other electronic devices. In some embodiments, a computing device may be associated with a device identifier. Examples of computing devices may include gas and electric meters, refrigerators, lamps, thermostats, printers, automobiles, fire alarms, home medical devices, home security systems, motorcycles, boats, televisions, etc. A computing device may be associated with a username, a password, a device identifier, one or more asymmetric keys that may be used for asymmetric encryption, one or more symmetric keys that may be used for symmetric encryption.

A "device identifier" may include any suitable distinctive set of characters used to identify a device. An exemplary device identifier may include any suitable number or type of characters (e.g., numbers, graphics, symbols, or other information) that may uniquely represent a device. By way of example, a device identifier may be a serial number, partial serial number, or device name or nickname. In some embodiments, a device identifier may be generated, based on a trusted hardware root. Additionally, the device identifier may be a temporary identifier for a particular device, such as a network address at which the device may be found.

"Asymmetric keys," also known as public/private key pairs, are used for asymmetric encryption and verification processes. In a typical verification process, a transmitting computing device may utilize its private key to encrypt a message, and the message may be verified by a receiving computing device using the public key of the transmitter. In a public-key encryption system, a computing device can encrypt a message using the public key of the receiver, but such a message can be decrypted only with the receiver's private key.

A "symmetric cryptographic key," also referred to as a "symmetric key" is a cryptographic key that is used for symmetric encryption. That is, a symmetric key may be used for both encryption of plain text and decryption of cipher text. For example, a transmitting device may encrypt a message using the symmetric key and a receiving device may decrypt the encrypted message using the same symmetric key. The symmetric key, in practice, represents a shared secret between two or more computing devices that can be used to maintain private information.

A "protocol set" may be a set of rules or configuration settings, each rule indicates that one or more actions are allowed and/or should be performed. In some cases, conditions upon which those actions are to be performed. In some embodiments, a protocol set may include conditional statements, such as "if x_condition occurs, then perform y_action." In some embodiments, a protocol set may include instructions that specify a manner in which a set of inputs provided by a set of computing devices is to be utilized to generate a symmetric cryptographic key. In some examples, the combination may be based on a time at which the symmetric key is generated, times at which each input was originally received, an identifier corresponding to each input received, or any suitable manner. As a non-limiting example, each input received may be assigned an identifier (e.g., an alphanumeric identifier). The protocol set may, in some embodiments, define a number and/or an order by which particular inputs are to be selected. In some embodiments, the particular number/order of the inputs may be determined based on a current time. Thus, three inputs may be received and assigned identifiers. The first input received may be assigned "1", the second input received "2", and the third input received "3." When a symmetric key is to be generated, the protocol set may specify that the key is to be generated with all three inputs in a particular order (e.g., 1-2-3, 2-3-1, etc.). In some embodiments, the combination and/or number of inputs used to generate the key may be constant (e.g., always use all inputs in numeric order according to the identifiers). In other examples, the protocol set may specify various combinations/numbers/orders of inputs based on a current time. As a non-limiting example, a symmetric key generated between 12:10:00 PM and 12:20:00 PM may utilize the combination of inputs 2 and 3, while another symmetric key generated between 12:20:01 PM and 12:30:00 PM may utilize a combination of inputs 1, 2, and 3, in that order. A generated symmetric key may be utilized by any two devices from a set of devices (e.g., the devices within a network) to exchange information with one another.

A "processing computer" may be any computing device configured to provide remote support for a computing device. The processing computer may provide any suitable service and/or processing for the computing device. In some embodiments, the processing computer may maintain a blockchain ledger on behalf of the computing device. The processing computer may also store one or more protocol sets. The processing computer may be a server computer.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

Details of some embodiments of the present invention will now be described.

Embodiments of the invention are directed to a network device (e.g., a computing device, a router, a processing computer, etc.) configured to generate symmetric cryptographic keys on behalf of one or more computing devices of a network. In some embodiments, an input may be received from two or more computing devices of the network. The input may include data that is derived from a cryptographic key of the device or by any suitable means. By way of example, a computing device may generate an input using a private key known only to the computing device. As a non-limiting example, the computing device may use a private key to encrypt its public key and provide the encrypted result as input to the network device. The network device may be configured to receive the input and store the input in a blockchain such that the input is tamper resistant. At any suitable time, the network device may be configured to generate a symmetric key for two or more computing devices of the network utilizing a protocol set accessible to the network device and the received inputs. The network device may provide the symmetric key to two (or more) of the computing devices of the network such that the two (or more) computing devices may include the symmetric key in any communication between them. Any suitable key transport process may be used to transport any generated keys, including encrypting the keys using an asymmetric encryption process. In other embodiments, a key exchange process such as a Diffie-Hellman key exchange process can be used.

By utilizing the symmetric key in such communications, the computing devices can verify that the message is authentic as only another device within the network would know the correct symmetric key.

FIG. 1 depicts an example system architecture capable of implementing at least some embodiments of the current disclosure. In FIG. 1, one or more computing devices may be in communication with a network device 102. In the example depicted, the network device 102 is a router of the network 104 (e.g., a local area network). The computing devices depicted in FIG. 1 include a gas meter 106, a refrigerator 108, a mobile device 110 (e.g., a smartphone), a garage door 112, and a lamp 114 (collectively referred to as "the computing devices"). The computing devices may be located within a vicinity of the network device 102. For example, the computing devices may be within range of a short range communication (e.g., Wi-Fi, Bluetooth, etc.) means used by the network device 102. Although a particular number of computing devices are depicted in FIG. 1, it should be appreciated that the number and/or type of computing devices with the network 104 may vary. In some embodiments, the computing devices 106, 108, 110, 112, 114 may be network devices, capable of performing the functions of network device 102.

In some embodiments, the network device 102 may be in communication with a processing computer 116 via the network 104 (e.g., the internet) or the processing computer 116 may also operate as part of the network 104.

The computing devices may individually be any electronic device configured to perform at least one primary function. The computing devices may individually include one or more processors capable of generating an input (e.g., encrypted data or any suitable input to be used for eventually generating of a symmetric key as discussed herein). The computing devices, the network device 102 and/or the processing computer 116 may include one or more processors configured to generate a symmetric key to be utilized in communications between two or more of the computing devices.

In some embodiments, the computing devices may include a communication interface configured to enable communication between the computing devices, the network device 102, and/or the processing computer 116. Examples of communication interface may include one or more radio frequency (RF) transceivers configured to send and receive communications using near-field communications (NFC), or other radio frequency or wireless communication protocols such as Bluetooth, Bluetooth low-energy (BLE), a wireless local area network (e.g., Wi-Fi), iBeacon, etc. In some embodiments, the communication interface may include both long range and short range communication means. For example, the communication interface may include an antenna configured to connect to a cellular network in order to enable communication with various other components of the depicted architecture. Additionally, the communication interfaces may include short range communication means for establishing a short range communication session.

In some embodiments, the computing devices may be configured to provide inputs to the network device 102. An input may be device specific. By way of example, each of the computing devices may store a public/private key pair. Each device may have been given an original public/private key pair by an administrator, or the pair may have been generated by the device itself. Upon connecting to the network device 102, or at any suitable time, a computing device may utilize its private key to digitally sign its public key. In another example, the computing device may utilize its private key to encrypt a device identifier (e.g., a serial number, a device name/identifier, a network address assigned to the device, etc.) or any suitable data associated with the computing device. In still further examples, the computing device may be configured with an algorithm used for generating inputs. The algorithm may utilize the private key and/or device specific data (e.g., the device identifier, serial number, network address, or the like) to generate a unique alphanumeric digest. The digital signature, encrypted data, and/or digest (collectively referred to as an "input") may be provided to the network device 102.

At any suitable time, the network device 102 may be configured to generate a symmetric key to be utilized in communications between any two of the computing devices. The symmetric key may be generated using any two of the inputs provided by the computing devices. Although in this example, the network device 102 (e.g., a router) is configured to receive inputs and generate symmetric keys, it should be appreciated that the processing computer 116 and/or any suitable computing device depicted in FIG. 1 may be similarly configured to receive inputs and generate symmetric keys.

The symmetric key generated (e.g., by the network device 102) may be distributed to the computing devices (or some subset of the computing devices) and the symmetric key may be utilized to encrypt the communications between the computing devices. As a non-limiting example, the mobile device 110 and the garage door 112 may individually generate inputs and provide said inputs to the network device 102. A symmetric key may be generated by the network device 102 and provided to the mobile device 110 and the garage door 112. The mobile device 110 may then transmit to the garage door 112 a message that is, at least partially, encrypted using the symmetric key. Upon receipt, the garage door 112 may be configured to decrypt the message utilizing the same symmetric key. Accordingly, the mobile device 110 and the garage door 112 may ensure that the data exchanged between them is secure.

By way of another example, each of the computing devices depicted in FIG. 1 may provide input to the network device 102. A symmetric key may be generated by the network device 102 from two or more of the inputs received. That is, inputs from the refrigerator 108, the gas meter 106, and the mobile device 110 may be combined according to a predetermined scheme (e.g., according to a protocol set discussed further below) such that a symmetric key is generated by the network device 102 using the received inputs. The symmetric key may be distributed to each of the computing devices. The mobile device 110 may then transmit a message to the garage door 112 (or any of the computing devices) that is, at least partially, encrypted using the symmetric key. Upon receipt, the garage door 112 (or other receiving device) may be configured to decrypt the message utilizing the same symmetric key. Accordingly, the computing devices may ensure that data exchanged between them is secure.

Figure 2:
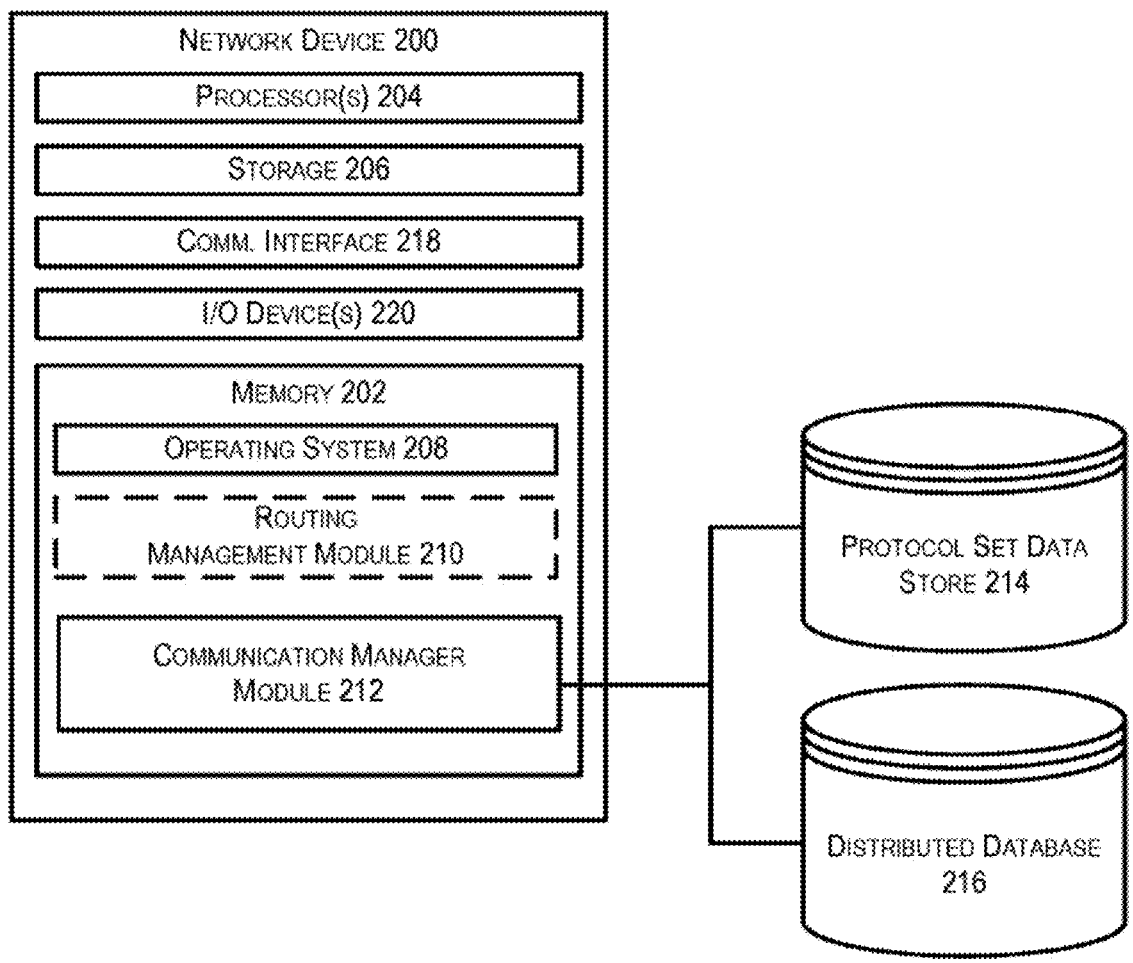
FIG. 2 depicts an example network device configured to store and manage inputs on behalf of computing devices of a network according to some embodiments.

FIG. 2 depicts an example network device 200 configured to store and manage a protocol set and inputs received from computing devices. The network device 202 may further be configured to generate a symmetric key to be utilized in communications between computing devices (e.g., the computing devices of FIG. 1) in accordance with at least some embodiments.

The network device 202 may be any type of electronic device capable of interacting with one or more electronic devices. In some embodiments, the network device 200 may be an electronic device that enables network access for one or more devices (e.g., a wireless router). In some examples, the network device 200 may be a computing device such as those depicted in FIG. 1 (e.g., the mobile device 110 of FIG. 1). In still further examples, the network device 202 may be an example of the processing computer 116 of FIG. 1. In at least some embodiments, the network device 200 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these programs. Depending on the configuration and type of network device 200, the memory 202 may be volatile (such as random access memory (RAM)) and/or non-volatile (such as read-only memory (ROM), flash memory, etc.). The network device 200 may also include storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the proxy device. In some embodiments, the memory 202 may include multiple different types of memory, such as static random access memory (SRAM), dynamic random access memory (DRAM) or ROM.

Turning to the contents of the memory 202 in more detail, the memory 202 may include an operating system 206 and one or more application programs, modules, or services for implementing the features disclosed herein. When the network device 200 (e.g., a wireless router) providing network routing functionality, the memory 202 may include a routing management module 210 configured to provide such network routing functionality. The memory 202 may also include a communication manager module 212. The communication manager module 212 may be configured to cause the processor(s) 204 to access a protocol set data store 214. The protocol set data store 214 may be configured to store a protocol set associated with the generation of symmetric keys. The protocol set may be predetermined and stored in the protocol set data store 214. The protocol set data store 214 may be accessible to the communication manager module 212 via any suitable network connections or the protocol set data store 214 may be included as part of memory 202.

The communication manager module 212 may be configured to cause the processor(s) 204 to receive inputs from a set of computing devices (e.g., the computing devices of FIG. 1). In some embodiments, the communication manager module 212 may be configured to cause the processor(s) 204 to manage and/or access a distributed database 216 that stores the inputs. The distributed database 216 may be an example of a blockchain in which entries of the blockchain depend on preceding entries of the blockchain. The blockchain stored within the distributed database 216 may be tamper-resistant. In some examples, the blockchain is modifiable by any of the devices depicted in FIG. 1. In other examples, the network device 200 manages the blockchain, but the contents of the blockchain are accessible to any of the computing devices of FIG. 1. An example of the blockchain is provided below with respect to FIG. 4.

In at least one embodiment, the communication manager module 212 may be configured to cause the processor(s) 204 to generate a symmetric key utilizing the inputs stored in the distributed database 216 according to the protocol set stored in the protocol set data store 214. The communication manager module 212 may be configured to cause the processor(s) 204 to provide a generated symmetric key to any suitable combination of the computing devices depicted in FIG. 1. In some embodiments, providing the generated symmetric key to the computing devices may include sending the symmetric key to the computing devices directly, or via a broadcasted message. The broadcasted message may be encrypted using SSL encryption or any other suitable encryption process. In other embodiments, the symmetric key may be shared using a Diffie-Hellman key sharing process. In other embodiments, providing the symmetric key may be provided via the blockchain (e.g., the distributed database 216) and retrievable by the computing devices via the blockchain.

Figure 3:
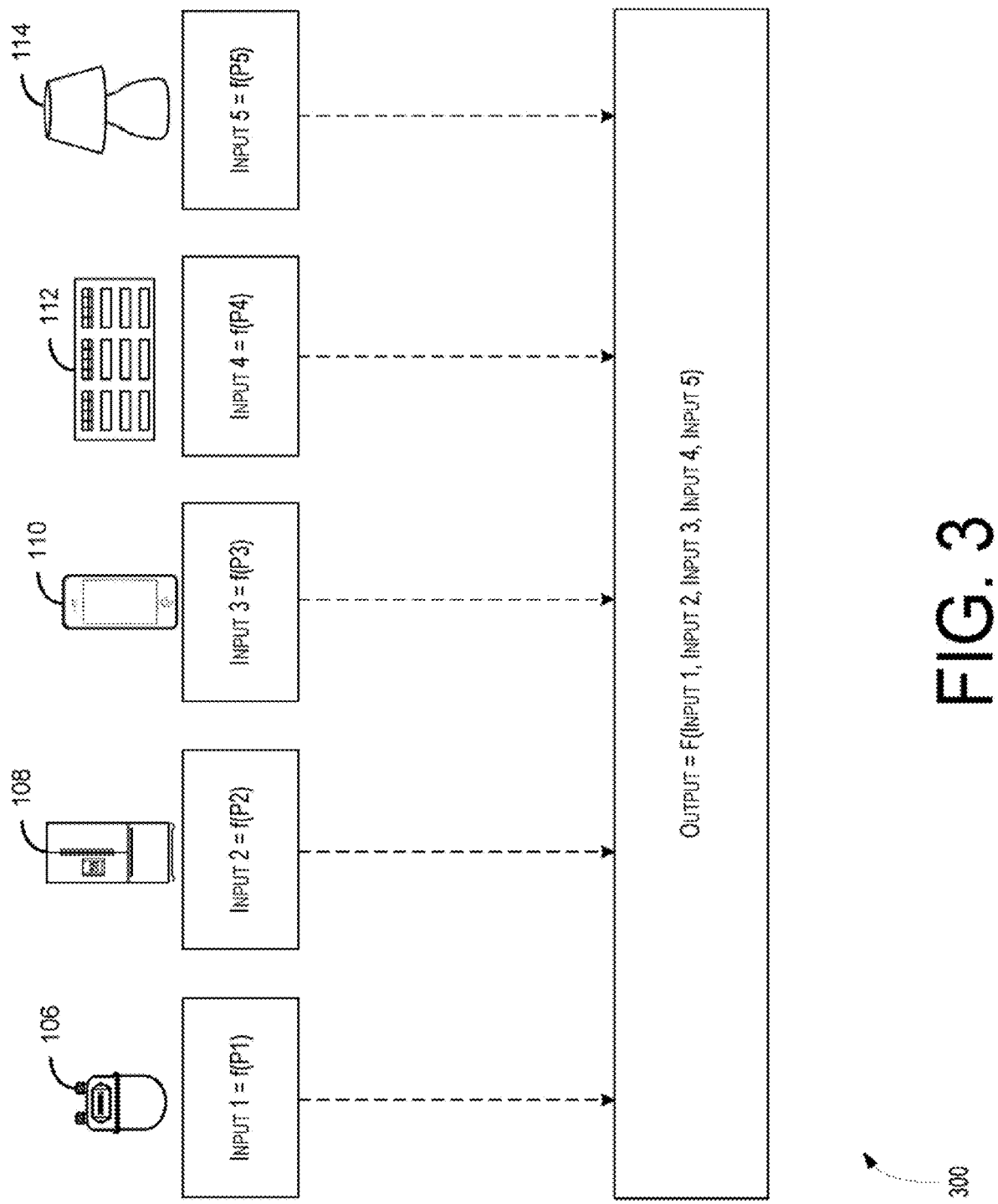
FIG. 3 depicts a schematic diagram of an input combination according to some embodiments.

FIG. 3 depicts a schematic diagram 300 of an input combination according to some embodiments. The computing devices of FIG. 1, namely the gas meter 106, the refrigerator 108, the mobile device 110, the garage door 112, and the lamp 114 are depicted in FIG. 3. Each of the computing devices may be configured to cause a corresponding processor of the computing device to generate a device specific input. By way of example, gas meter 106 may be configured to cause its processor to generate input 1. Input 1 may be computed based on a function (e.g., function "f") and a private key associated with the gas meter 106 (e.g., P1). Similarly, processors of the refrigerator 108, the mobile device 110, the garage door 112, and the lamp 114, may be configured to generate input 2, input 3, input 4, and input 5, respectively. Inputs 2-5 may be generated utilizing the same (or different) function and a corresponding private key associated with each device (e.g., P2, P3, P4, and P5, respectively). In other examples, the inputs may be generated based on any suitable function and/or data specific to the computing device.

The inputs 1, 2, 3, 4, and 5 can have independent functions. For example, inputs 1, 2, 3, 4, and 5 may be identity tokens that can be used to identify the devices which originally possessed them. In some cases, as noted above, an input may be a public key of a device encrypted or signed by its corresponding private key. This may be an identity token and may be transmitted from one device to another device. The receiving device may use the sending devices public key to verify that the message was in fact sent by the sending device. In other embodiments, the identity token can itself be an encryption key that is used by the device which possesses it to encrypt messages for secure data transmission to and/or from the device.

An output (e.g., a symmetric key) may be generated using a function "F" and two or more of the inputs. As depicted in FIG. 3, the function F may utilize input 1, input 2, input 3, input 4, and input 5, in that order, as input variables. The function "F" may be predetermined, or the function "F" may vary as specified within a protocol set (e.g., stored in the protocol set data store 214 of FIG. 2). The order and/or combination of the inputs to be utilized with the function "F" may also be specified within the protocol set. Although in this example, all five inputs may be utilized, it should be appreciated that any suitable number (e.g., two or more) of the inputs may be utilized. Thus, the output may be generated using 2, 3, or 4 of the inputs for example.

In some embodiments, the inputs of the computing devices may be assigned an identifier (e.g., as depicted "Input 1," "Input 2," "Input 3," "Input 4," and "Input 5." The identifier may be any suitable alphanumeric identifier. The identifier may be assigned randomly or, for example, based on a time and/or order at which the input was stored in the blockchain (e.g., Block 1 of the blockchain may be utilized as a first input, Block 2 of the blockchain may be utilized as a second input, etc.).

In some embodiments, the function "F" and/or the particular number and/or order of the inputs may be specified within the protocol set stored in the protocol set data store 214 of FIG. 2. In some examples, the protocol set may be indexed such that the function "F" and/or the number/order of the inputs may change based on another input variable (e.g., a counter, a time, etc.). As a non-limiting example, a function F1 and a combination/order of inputs (e.g., Input 1, Input 2, and Input 3) may be specified for index 1. A function F2 and a combination order of inputs (e.g., Input 2, Input 3) may be specified for index 2. The function F1 and a combination/order of inputs (e.g., Input 3, Input 1, Input 2, and Input 2) may be specified by index 2. Accordingly, the first symmetric key generated may be generated using the function and input combination specified by index 1. The next symmetric key generated may be generated using the function and input combination specified by index 2. The third symmetric key generated may be generated using the function and input combination specified by index 3.

As another non-limiting example, the protocol set may include an indexed list that specifies the type of function and/or the particular number/order of input combination to be utilized to generate various symmetric keys. In some embodiments, the index may be determined based on a time (e.g., a current time, a time at which symmetric key generation commences, a time at which symmetric key generation is requested, etc.). Accordingly, a function F1 and Inputs 1, 3, and 5 may be utilized at time 1 (e.g., 1:00 AM), while a function F2 and Inputs 2, 4, and 1 may be utilized at time 2 (e.g., 2:05 PM). Any suitable information for generating a symmetric key may be specified within the protocol set and utilized by any computing device (e.g., the network device 200 of FIG. 2).

Figure 4:
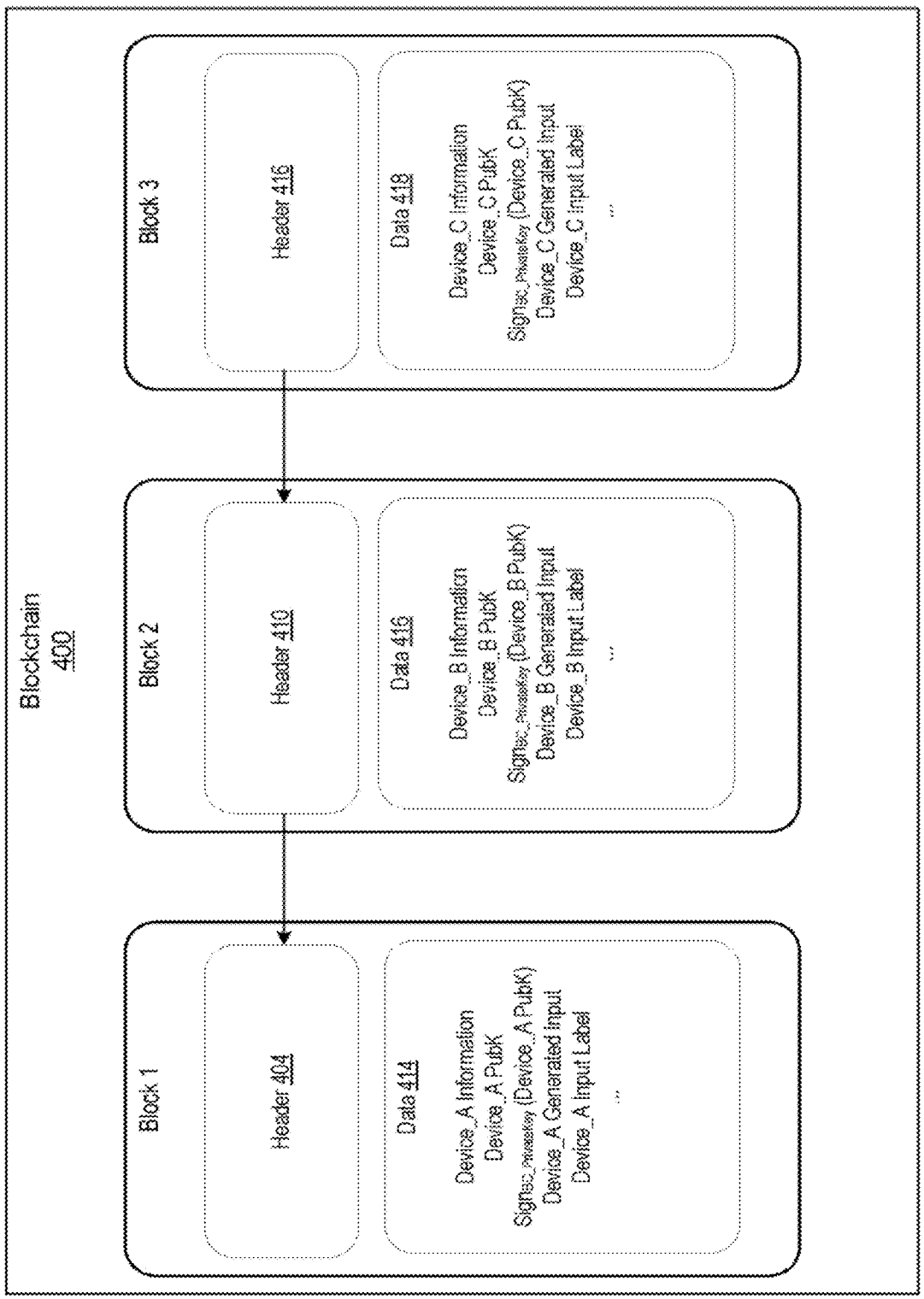
FIG. 4 depicts an example of a portion of a blockchain according to some embodiments.

FIG. 4 depicts an example of a portion of a blockchain 400 according to some embodiments. The portion of a blockchain 400, may include a number of blocks 1, 2, 3, each block including respective headers 404, 410, and 416. Each header may include data elements including version numbers, previous block hashes, merkle roots, and timestamps. Each block may also include device-specific data including a device identifier (e.g., a serial number, a network address, a device name, etc.), a cryptographic key associated with the device (e.g., a public key of the device), a digital signature associated with the device (e.g., the public key of the device as digitally signed with a private key of the blockchain, the device identifier as digitally signed with a private key of the blockchain, etc.), generated input associated with the device, and an input label associated with the generated input (e.g., "Input 1," "A", "I1," etc.).

In FIG. 4, data 414 may include Device_A Information, Device_A PubK, $Sign_{BC\_PrivateKey}$ (Device_A PubK), Device_A Generated Input, and Device_A Input Label. Device_A Information may be the serial number, network address, device name or any suitable information associated with Device_A (e.g., the mobile phone 110 of FIG. 1). Device_A PubK may be a public key associated with Device_A (the corresponding private key may be stored in Device A's memory). $Sign_{BC\_PrivateKey}$ (Device_A PubK) may be a digital signature that is the public key of Device_A, signed by a private key of the blockchain. Device_A Generated Input may be an input generated by Device_A (e.g., Input 3 of FIG. 3). In some embodiments, the generated input may be generated by Device_A utilizing a function (e.g., function "f" of FIG. 3) and a private key (e.g., P3, the private key of Device_A). In some embodiments, the input generated by the device may be digitally signed by the private key of the blockchain. Device_A Input Label may include an identifier for the generated input (e.g., "Input 1," "I1", "A," etc.). Alternatively, a block identifier (e.g., block 1) may be utilized as an identifier of the generated input. In such examples, the Device_A Input Label may not be included within data 414.

Data 416 and data 418 may include similar device-specific information corresponding to device B (e.g., the garage door 112 of FIG. 1) and device C (e.g., the lamp 114 of FIG. 1), respectively. Any suitable number of blocks may be included in the blockchain, each block corresponding to a device for which generated input has been provided. The blockchain may be accessible each of the computing devices of FIG. 1 and/or the network device 200 of FIG. 2.

Figure 5:
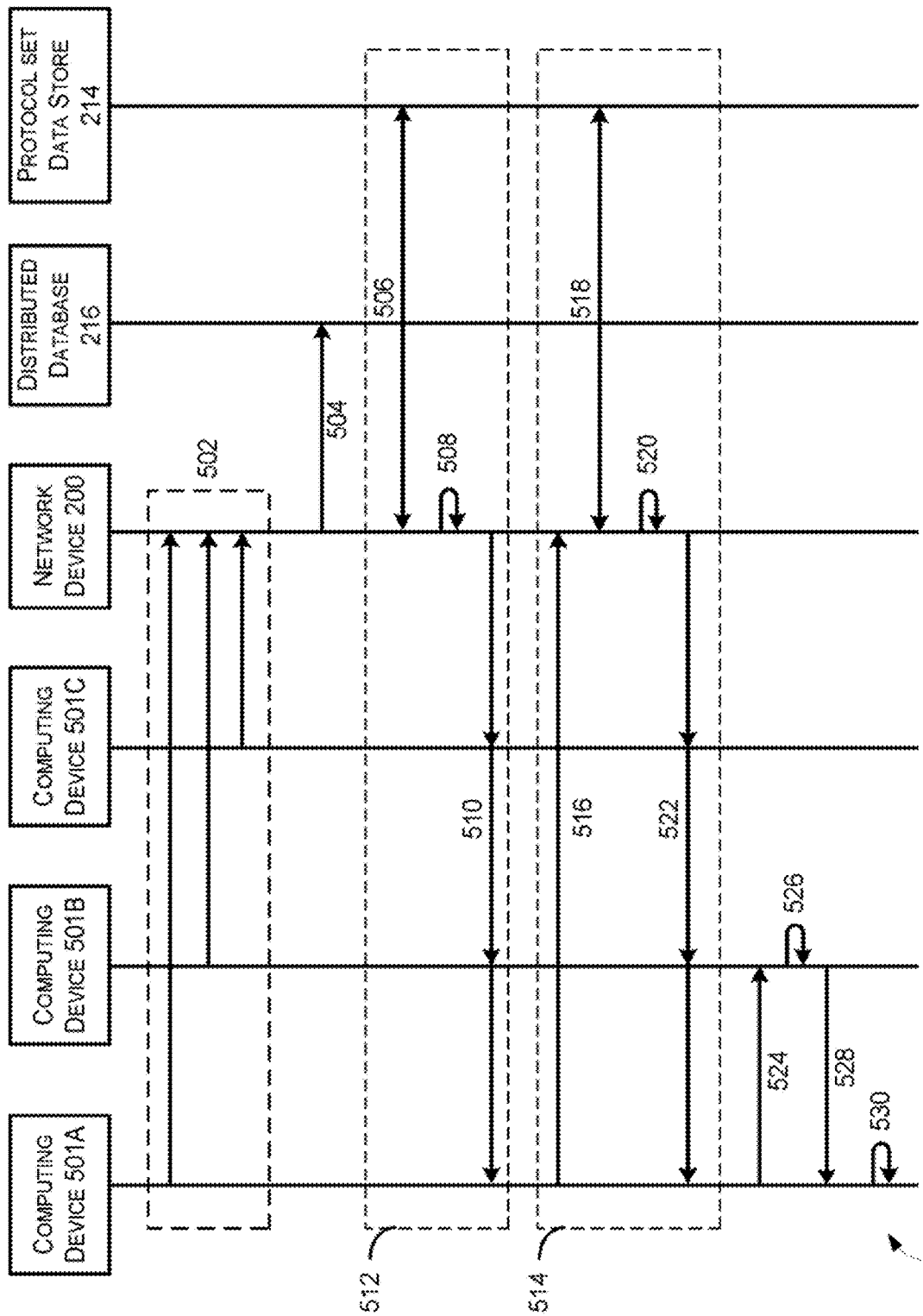
FIG. 5 depicts a flow diagram illustrating a process for generating a symmetric cryptographic key using at least two of a set of inputs according to some embodiments.

FIG. 5 depicts a flow diagram illustrating a process 500 for generating a symmetric cryptographic key using at least two of a set of inputs according to some embodiments. Some or all of any of the processes described herein (or variations and/or combinations thereof) may be performed under the control of one or more computer systems configured with executable instructions and may be implemented as code (e.g., executable instructions, one or more computer programs or one or more applications). In accordance with at least one embodiment, the process 500 of FIG. 5 may be performed by at least the network device 200 of FIG. 2 (e.g., an example of a computing device of FIG. 1, the network device 102, or the processing computer 116 of FIG. 1). The code may be stored on a computer-readable storage medium, for example, in the form of a computer program including a plurality of instructions executable by one or more processors. The computer-readable storage medium may be non-transitory.

Process 500 may begin at 502, when a set of computing devices (e.g., computing device 501A, 501B, and 501C, collectively referred to as "the computing devices 501) may generate input and provide the input to the network device

200. The computing devices 501 may include a greater, or lesser, number of computing devices then the three depicted in FIG. 5. The computing device 501A may correspond to the mobile device 110 of FIG. 1. The computing device 501B may correspond to the gas meter 106 of FIG. 1. The computing device 501C may correspond to the refrigerator 108 of FIG. 1. The inputs may be generated and provided to the network device 200 in any suitable order. In some embodiments, the individual computing devices may be configured to cause an input to be generated at any suitable time, such as when the computing device connects to the network device 200, when the computing device determines that a message is to be transmitted to another computing device, or at any suitable time.

At 504, the network device 200 may be configured to cause its processor to provide each of the generated inputs provided at 502 to the distributed database 216 (e.g., a blockchain). Each generated input may be stored as an entry (e.g., a block such as those depicted in FIG. 4) which causes the generated input to be tamper resistant. In some embodiments, the network device 200 may assign each generated input a label as an identifier for the generated input provided by each computing device.

In some embodiments, the flow may proceed to 506 where the protocol set data store 214 is accessed by the network device 200. By consulting the protocol set data store 214, the network device 200 may determine a function and/or an order, number, and/or combination of the generated inputs from which to generate a symmetric key. As a non-limiting example, the protocol set data store 214 may provide information at 506 that specifies that a symmetric key should be generated using the combination of the generated input 1 (e.g., corresponding to the computing device 501A), generated input 2 (e.g., corresponding to the computing device 501B), and generated input 3 (e.g., corresponding to the computing device 501C), in that order.

At 508, the network device 200 may generate a symmetric key in accordance with the function and/or order/number/combination of generated inputs specified by the protocol set at 506. In some embodiments, the same function may be utilized each time a symmetric key is generated while the number, order, and/or combination of the generated inputs may vary. As another example, the function and/or number/order/combination of generated inputs may be indexed within the protocol set. As part of generating the symmetric key, the network device 200 may first determine an index prior to accessing the protocol set data store 214 at 506. The index may correspond to a counter, a current time, or the like. Thus, the index may first be defaulted to "1." A function and/or number/order/combination of generated inputs may associated with index 1 and returned at 506 and used to generate a symmetric key at 508. By way of example, the index 1 may correspond with a block of a blockchain or a label assigned to a particular input generated from a particular device. After a symmetric key is generated using the function and/or number/order/combination of generated inputs associated with index 1, the counter may be incremented (e.g., to index "2"). A subsequent symmetric key may be generated utilizing the function and/or number/order/combination of generated inputs associated with index 2. The network device 200 may generate a new symmetric key after a predetermined period of time, after a particular number of messages have utilized the previously-generated symmetric key, at each initial message transaction between two devices, according to a schedule as defined in the protocol set, or at any suitable time. In some embodiments, the index used to retrieve the function and/or number/order/combination of generated inputs to be used to generate a symmetric key may be based on a time (e.g., a current time, a time range, etc.) at which the index is determined. This process provide the technical advantage of creating encryption keys according to process that is not predictable to the outside observer, thus improving data security.

At 510, the network device 200 may be configured to cause its processor(s) to provide the generated symmetric key to one or more of the computing devices. As a non-limiting example, the generated symmetric key may be provided to the computing devices 501. In at least some embodiments, the process 512 including the steps 506-510 may be repeated any suitable number of times. In some examples, the process 512 may be repeated after an expired period of time (e.g., at the expiration of 1 minute), at a particular frequency (e.g., every 2 minutes), according to a predetermined schedule (e.g., a schedule defined in the protocol set data store 214), by request, or the like.

The process 514 may depict another example process for generating a symmetric key that is initiated by the computing device 501A. In process 514, the computing device 501A transmits a request to the network device 200 for a symmetric key at 516. The request transmitted at 516 may be in any suitable format. At 518, the network device 200 may access the protocol set data store 214 in a similar manner as discussed at 506. The network device 200 may generate a symmetric key at 520 in a similar manner as discussed above at 508. Once generated, the symmetric key may be provided by the network device 200 to any suitable combination of the computing devices 501 at 522. In some embodiments, the process 514 may be repeated any suitable number of times.

At 524, the computing device 501A may utilize the received symmetric key to provide data to the computing device 501B. In some embodiments, the computing device 501A may utilize the symmetric key to encrypt the data sent to the computing device 501B.

At 526, the computing device 501B may utilize the symmetric key to decrypt the data received from the computing device 501A. At 528, the computing device 501B may transmit data to the computing device 501A utilizing the symmetric key to encrypt the data. At 530, the computing device 501A may decrypt the received data utilizing the symmetric key. It should be appreciated that the symmetric key utilized at 528 and 530 may differ from the symmetric key utilized at 524 and 526 if the process 512 and/or the process 514 is performed after 526 but before 528.

Figure 6:
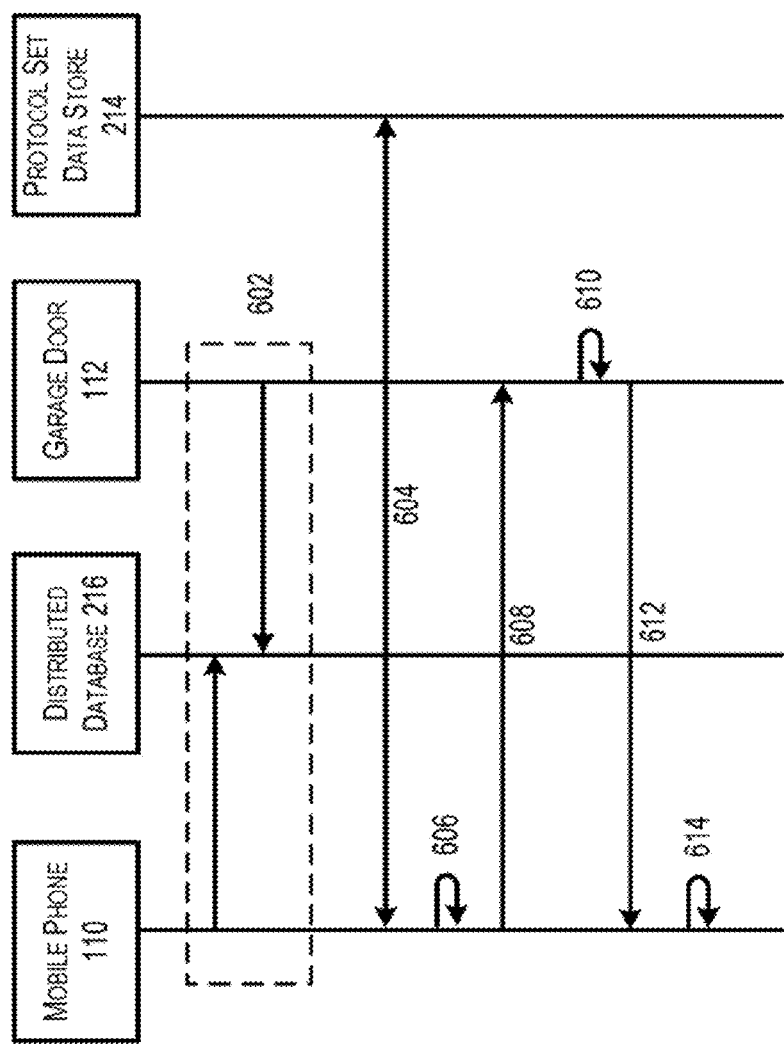
FIG. 6 depicts another flow diagram illustrating a process for generating a symmetric cryptographic key using at least two of a set of inputs according to some embodiments.

FIG. 6 depicts another flow diagram illustrating a process 600 for generating a symmetric cryptographic key using at least two of a set of inputs according to some embodiments. Some or all of any of the processes described herein (or variations and/or combinations thereof) may be performed under the control of one or more computer systems configured with executable instructions and may be implemented as code (e.g., executable instructions, one or more computer programs or one or more applications). In accordance with at least one embodiment, the process 600 of FIG. 6 may be performed by any combination of the computing devices of FIG. 1. To simplify the example depicted in FIG. 6, only the mobile phone 110 and the garage door 112 are utilized, but it should be appreciated that other combinations of the computing device of FIG. 1 may be utilized. The code execute during the process 600 may be stored on a computer-readable storage medium, for example, in the form of a computer program including a plurality of instructions executable by one or more processors. The computer-readable storage medium may be non-transitory.

The process 600 may begin at 602, where the mobile phone 110 and the garage door 112 each provide data to the distributed database 216 (e.g., a blockchain). The data may include similar information as the data 414, the data 416, or the data 418 of FIG. 4. The data provided by the mobile phone 110 may include an input generated by the mobile phone 110. In some embodiments, the generated input may be derived from a cryptographic key of the mobile phone 110. By way of example, the mobile phone 110 may generate input by digitally signing its public key using its private key. Similarly, the data provided by the garage door 112 may include an input generated by the garage door 112 (e.g., the public key of the garage door 112 as digitally signed by the private key of the garage door 112).

At 604, the mobile phone 110 may access the protocol set data store 214 to retrieve a function and/or order/number/combination of generated inputs that are to be used to generate a symmetric key. The mobile phone 110 may be triggered to access the protocol set data store 214 based on an expiration of a timer, according to a predetermined schedule (e.g., defined within the protocol set data store 214), as a result of a determination that a message is to be transmitted from the mobile phone 110 to the garage door 112, or the like.

At 606, the mobile phone 110 may generate a symmetric key in accordance with the function and/or order/number/combination of generated inputs provided by the protocol set at 604. As described above, the same function may be utilized each time a symmetric key is generated while the number, order, and/or combination of the generated inputs may vary. As another example, the function and/or number/order/combination of generated inputs may be indexed within the protocol set. As part of generating the symmetric key, the mobile phone 110 may first determine an index prior to accessing the protocol set data store 214 at 604. The index may correspond to a counter, a current time, or the like. Thus, the index may first be defaulted to "1." A function and/or number/order/combination of generated inputs may associated with index 1 and returned at 604 and used to generate a symmetric key at 606. By way of example, the index 1 may correspond with a block of a blockchain or a label assigned to a particular input generated from a particular device. After a symmetric key is generated using the function and/or number/order/combination of generated inputs associated with index 1, the counter may be incremented (e.g., to index "2"). A subsequent symmetric key may be generated utilizing the function and/or number/order/combination of generated inputs associated with index 2. After the symmetric key is generated using the information associated with index 2 of the protocol set, the counter may be incremented again, and after every symmetric key generation. The mobile phone 110 may generate a new symmetric key after a predetermined period of time, after a particular number of messages have utilized the previously-generated symmetric key, at each initial message transaction between two devices, according to a schedule as defined in the protocol set, or at any suitable time. In some embodiments, the index used to retrieve the function and/or number/order/combination of generated inputs to be used to generate a symmetric key may be based on a time (e.g., a current time, a time range, etc.) at which the index is determined.

At 608, the mobile phone 110 may utilize the received symmetric key to provide data to the garage door 112. In some embodiments, the mobile phone 110 may utilize the symmetric key to encrypt the data sent to the garage door 112.

At 610, the garage door 112 may utilize the symmetric key to decrypt the data received from the mobile phone 110. At 612, the garage door 112 may transmit data to the mobile phone 110 (or another computing device) utilizing the symmetric key to encrypt the data. At 614, the mobile phone 110 (or the receiving computing device) may decrypt the received data utilizing the symmetric key. It should be appreciated that the symmetric key utilized at 608 and 610 may differ from the symmetric key utilized at 612 and 614 a new symmetric key has been generated after 608 but before 612.

Embodiments of the invention provide for a number of technical advantages. For example, embodiments of the invention enable computing devices to conduct more secure transaction with other computing devices of a network. A symmetric key generated in the manner described herein is more secure than a single key utilized in convention encryption because two or more inputs (e.g., derived by cryptographic keys of corresponding computing devices) are utilized in combination, according to a protocol set that defines the manner in which a symmetric key is to be generated from the two or more inputs. The inputs may be stored as part of a blockchain, making such data tamper resistant. Additionally, the protocol set defines a scheme (e.g., one or more functions, one or more order/number/combinations of generated input) by which symmetric keys are generated. Accordingly, an entity attempting to intercept communications between devices of the network would not only need access to the distributed database 216 (which is tamper resistant), but would also need to obtain the protocol set in order to ascertain the correct scheme be which symmetric keys are generated. The likelihood of hacking the blockchain as well as obtaining the protocol set is exceptionally small. Thus, utilizing the combination of the blockchain and the protocol set provides a secure manner of keeping information between two devices in a network private. The symmetric keys generated through the use of the blockchain and the protocol set may be more secure than conventional methods of utilizing a cryptographic key to secure communications between devices. This is at least because the symmetric key utilized herein is generated using data derived from two or more cryptographic keys rather than a single cryptographic key.

A computer system can include a plurality of the same components or subsystems, e.g., connected together by external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary.

What is claimed is:

1. A computer-implemented method, comprising:
    obtaining, by a network device, a plurality of inputs associated with a plurality of computing devices;
    storing, by the network device, the plurality of inputs in a blockchain, each of the plurality of inputs being associated with a respective identifier of a plurality of identifiers based at least in part on being stored in the blockchain;
    storing a protocol set comprising a list of a plurality of predefined functions, each function of the plurality of predefined functions being associated with a respective indication of a respective combination of two or more identifiers corresponding to two or more inputs of the plurality of inputs that are stored in the blockchain; and
    generating, by the network device, a symmetric cryptographic key using the function identified from the protocol set and the at least two inputs of the plurality of inputs stored in the blockchain, the at least two inputs being used as input variables for the function according to an order indicated by a combination of the two or more identifiers that are associated with the function, wherein the symmetric cryptographic key is thereafter used to encrypt communications between at least two computing devices of the plurality of computing devices.

2. The computer-implemented method of claim 1, wherein the network device is a router that receives a symmetric cryptographic key request from a first computing device of the plurality of computing devices, the first computing device having determined that a message is to be transmitted to a second computing device of the plurality of computing devices.

3. The computer-implemented method of claim 1, wherein the network device is one computing device of the plurality of computing devices.

4. The computer-implemented method of claim 1, wherein at least two of the plurality of predefined functions utilize different numbers of inputs from the plurality of inputs.

5. The computer-implemented method of claim 1, wherein an input of the plurality of inputs comprises data generated utilizing a private key associated with one computing device of the plurality of computing devices.

6. The computer-implemented method of claim 1, further comprising:
    receiving, by the network device from a requesting device of the plurality of computing devices, a request for the symmetric cryptographic key, wherein the symmetric cryptographic key is provided to the requesting device in response to the request.

7. The computer-implemented method of claim 1, wherein the symmetric cryptographic key is generated according to a predetermined frequency or a predetermined schedule, the predetermined frequency or the predetermined schedule being defined by the protocol set associated with symmetric cryptographic key generation.

8. The computer-implemented method of claim 1, further comprising providing the symmetric cryptographic key to each of the plurality of computing devices, wherein receiving the symmetric cryptographic key causes each of the plurality of computing devices to store the symmetric cryptographic key locally.

9. The computer-implemented method of claim 1, wherein subsequent communications between the two computing devices of the plurality of computing devices utilize the symmetric cryptographic key to encrypt outgoing communications and to decrypt incoming communications.

10. The computer-implemented method of claim 1, wherein subsequent symmetric cryptographic keys are generated by the network device utilizing a portion of the plurality of inputs stored in the blockchain, the network device generating the subsequent symmetric cryptographic keys upon expiration of a timer associated with the protocol set, the protocol set defining rules for generating various symmetric cryptographic keys.

11. A network device, comprising:
    a processor; and
    a memory including executable instructions that, when executed by the processor, cause the network device to:
        obtain a plurality of inputs associated with a plurality of computing devices;
        store the plurality of inputs associated with the plurality of computing devices in a blockchain, each of the plurality of inputs being associated with a respective identifier of a plurality of identifiers based at least in part on being stored in the blockchain;
        store a protocol set comprising a list of a plurality of predefined functions, each function of the plurality of predefined functions being associated with a respective indication of a respective combination of two or more identifiers corresponding to two or more inputs of the plurality of inputs that are stored in the blockchain; and generate a symmetric cryptographic key using the function identified from the protocol set and at least two inputs of the plurality of inputs stored in the blockchain, the at least two inputs being used as input variables for the function according to an order indicated by a combination of the two or more identifiers that are associated with the function, wherein the symmetric cryptographic key is thereafter used to encrypt communications between at least two computing devices of the plurality of computing devices.

12. The network device of claim 11, wherein the plurality of inputs obtained from the plurality of computing devices are derived using respective cryptographic keys of the plurality of computing devices.

13. The network device of claim 11, wherein the network device provides one of the plurality of inputs.

14. The network device of claim 11, wherein executing the instructions further causes the network device to:

determine an index based on at least one of a counter or a time, wherein selecting, the function from the plurality of predefined functions is based at least in part on selecting the function based at least in the index.

15. The network device of claim 11, wherein a first function of the plurality of predefined functions utilizes a first combination of two or more of the plurality of inputs, wherein a second function of the predefined functions utilizes a second combination of two or more of the plurality of inputs, the first combination of the two or more of the plurality of inputs being different from the second combination of the two or more of the plurality of inputs.

16. The network device of claim 11, wherein a first function of the plurality of predefined functions utilizes a first number of two or more of the plurality of inputs, wherein a second function of the predefined functions utilizes a second number of two or more of the plurality of inputs, the first number being different from the second number.

17. The network device of claim 11, wherein the plurality of inputs are generated by the plurality of computing devices, a first computing device of the plurality of computing devices generating a first input of the plurality of inputs using a first function, a second computing device of the plurality of computing devices generating a second input of the plurality of inputs using a second function.

18. The network device of claim 17, wherein the first function is different from the second function.

19. The network device of claim 11, wherein the plurality of identifiers indicate an corresponding order by which the plurality of inputs were stored in the blockchain.

20. The network device of claim 11, wherein at least one of the plurality of inputs is utilized more than once in the function identified from the protocol set.

* * * * *